(12) United States Patent
Naik et al.

(10) Patent No.: US 8,689,241 B2
(45) Date of Patent: Apr. 1, 2014

(54) DYNAMIC EVOCATIONS FOR COMPUTER EVENT MANAGEMENT

(75) Inventors: Nilesh Naik, Maharashtra (IN); Nitin Rathod, Pune (IN); Satish Khodke, Pune (IN)

(73) Assignee: BMC Software, Inc., Houston, TX (US)

(*) Notice: Subject to any disclaimer, the term of this patent is extended or adjusted under 35 U.S.C. 154(b) by 119 days.

(21) Appl. No.: 13/250,999

(22) Filed: Sep. 30, 2011

(65) Prior Publication Data
US 2013/0086587 A1    Apr. 4, 2013

(51) Int. Cl.
G06F 13/00 (2006.01)

(52) U.S. Cl.
USPC .......................................................... 719/318

(58) Field of Classification Search
USPC .......................................................... 719/318
See application file for complete search history.

(56) References Cited

U.S. PATENT DOCUMENTS

| | | | | |
|---|---|---|---|---|
| 7,774,370 B2* | 8/2010 | Sampson | | 707/793 |
| 7,827,272 B2* | 11/2010 | Poletto et al. | | 709/224 |
| 7,853,435 B2* | 12/2010 | Dodge et al. | | 702/183 |
| 8,280,844 B2* | 10/2012 | Warn et al. | | 707/607 |
| 8,359,278 B2* | 1/2013 | Domenikos et al. | | 705/325 |
| 2004/0261030 A1* | 12/2004 | Nazzal | | 715/738 |
| 2006/0294214 A1* | 12/2006 | Chou | | 709/223 |
| 2010/0115617 A1* | 5/2010 | Weber et al. | | 726/23 |
| 2010/0235918 A1* | 9/2010 | Mizrahi et al. | | 726/25 |
| 2010/0272414 A1* | 10/2010 | Reneris | | 386/83 |
| 2011/0032260 A1* | 2/2011 | Duggan et al. | | 345/440 |

* cited by examiner

Primary Examiner — Andy Ho
(74) Attorney, Agent, or Firm — Brake Hughes Bellermann LLP

(57) ABSTRACT

According to an example implementation, a computer-readable storage medium, computer-implemented method and a system are provided to detect a plurality of computer events, determine an event severity for each event, select a set of the events having a highest severity of the plurality of events, determine an event category for each event in the set of events, display an event management console including an entry for each event of the set of events, each entry in the event management console including at least an event description and an event severity indicator that indicates event severity, and wherein the displayed event management console also includes one or more evocations for each event category of the set of events, each evocation providing a suggested course of action to address events of the event category.

24 Claims, 4 Drawing Sheets

FIG. 2

DYNAMIC EVOCATIONS FOR COMPUTER EVENT MANAGEMENT

TECHNICAL FIELD

This description relates to event management.

BACKGROUND

A variety of events may occur. These events may relate to a wide variety of areas or topics. Computer event management may involve detecting an event, and identifying the problem and/or a solution to the problem.

SUMMARY

According to an example implementation, a non-transitory computer-readable storage medium is provided that includes computer-readable instructions stored thereon that, when executed, are configured to cause a processor to at least: detect a plurality of computer events, determine an event severity for each event; select a set of the events having a highest severity of the plurality of events, determine an event category for each event in the set of events, display an event management console including an entry for each event of the set of events, each entry in the event management console including at least an event description and an event severity indicator that indicates event severity, wherein the displayed event management console also includes one or more evocations for each event category of the set of events, each evocation providing a suggested course of action to address events of the event category.

According to another example implementation, a computer implemented method is provided. The method includes detecting a plurality of computer events, determining an event severity for each event, selecting a set of the events having a highest severity of the plurality of events, determining an event category for each event in the set of events, displaying an event management console including an entry for each event of the set of events, each entry in the event management console including at least an event description and an event severity indicator that indicates event severity, wherein the displayed event management console also includes one or more evocations for each event category of the set of events, each evocation providing a suggested course of action to address events of the event category.

According to another example implementation, a computer system is provided that includes instructions recorded on a computer-readable storage medium and readable by at least one processor. The system includes event detection logic configured to detect a plurality of computer events, severity determination logic configured to determine an event severity for each event, selection logic configured to select a set of the events having a highest severity of the plurality of events, category determination logic configured to determine an event category for each event in the set of events, display logic configured to display an event management console including an entry for each event of the set of events, each entry in the event management console including at least an event description and an event severity indicator that indicates event severity, wherein the displayed event management console also includes one or more evocations for each event category of the set of events, each evocation providing a suggested course of action to address events of the event category.

The details of one or more implementations are set forth in the accompanying drawings and the description below. Other features will be apparent from the description and drawings, and from the claims.

BRIEF DESCRIPTION OF THE DRAWINGS

FIG. 2 is a diagram illustrating an exemplary event management console 213.

DETAILED DESCRIPTION

Figure 1:
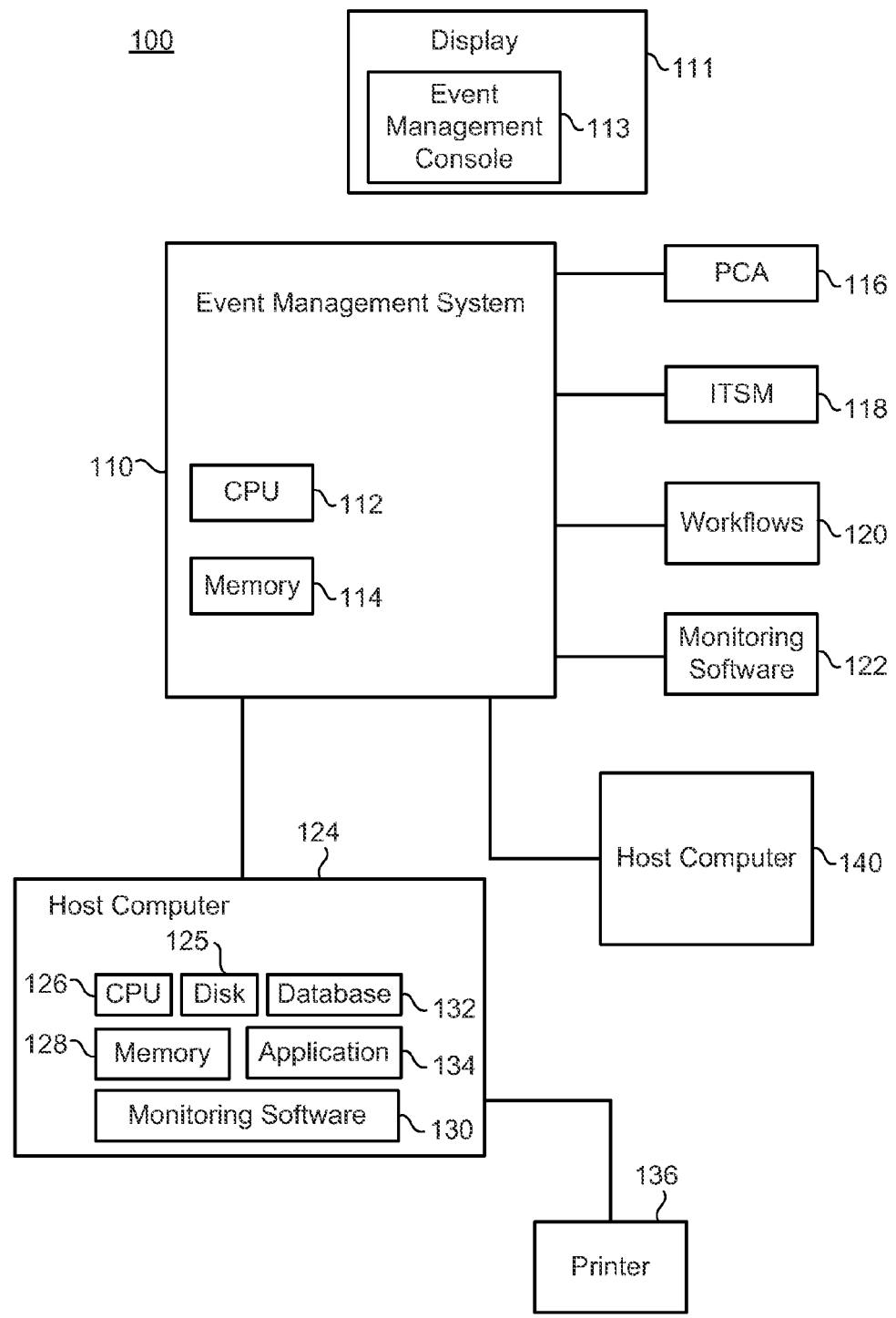
FIG. 1 is a block diagram of an exemplary system 100 for generating and displaying event information and dynamic evocations for computer event management.

FIG. 1 is a block diagram of an exemplary system 100 for generating and displaying event information and dynamic evocations for computer event management. System 100 includes an event management system 110, a display 111, and a number of host computers, such as host computers 124 and 140. Event management system 110 may be provided or running on a computer that includes a CPU 112 (or processor) for executing instructions, and memory 114 for storing information and instructions. Event management system 110 may receive event notifications (or event information) for one or more computer events that may occur on one or more computers (or other computing devices). Event management system 110 may receive event notifications for hardware and/or software events, and may select a set of events for display, for example, based on event severity and/or business priority (e.g., the top N events selected that have the highest event severity and/or highest business priority).

Event management system 110 may also generate and display an event management console 113 on display 111. Event management console 113 may include an entry (e.g., row) for each event of a set of selected events, e.g., where the set of events may be selected for display based on severity and/or business priority. Each entry in the event management console 113 may provide information for an event, such as a description of the event, severity and/or business priority of the event, time/date of the event, etc. For example, event management system 110 may select N events having the highest severity for display on the event management console 113. Or if there are too many (e.g., more than N) events having a same or highest severity, then the N events having this highest severity may be selected that have the highest business priority. In such case, severity may be used as a primary factor and business priority as a secondary factor in selecting a set of N events for display. Alternatively, business priority may be used as a primary factor and severity may be used as a secondary factor in selecting a set of N events for display. Alternatively, business priority alone may be used to select a set of events for display, e.g., events selected for display having a highest business priority. Thus, event severity and/or business priority may be used to select a set of events for display on the event management console 113.

Event management system 110 may receive information, such as event notifications, for each of a variety of computer events. Information for some, or a selected set, of these events may be displayed on event management console 113. Events may cover a variety of events or occurrences, e.g., for hardware events and/or software events. Events may be grouped into event categories, such as, for example: printer events (e.g., printer offline, out of paper), network access events (e.g., network interface not operating, network down), CPU events (e.g., CPU usage exceeds a threshold), disk/memory events (e.g., disk or memory usage exceeds a threshold), database events (e.g., database error, database corrupted, database inaccessible), or other software application events which may identify an event or problem with another application or program.

By way of example, host computer 124 may include one or more hardware blocks to be monitored for events, such as CPU 126, a hard drive or disk 125, memory 128, and printer 136. One or more software programs may be running on CPU 126 of host computer 124, and may also be monitored for events. For example, a monitoring application (or monitoring software) 130 may be running on CPU 126 of host computer 124 to monitor events for various hardware blocks and/or one or more software programs running on host computer 124. Monitoring software 130 may detect one or more events for the monitored hardware or software, and when an event is detected, monitoring software 130 may send an event notification to event management system 110. Other host computers, such as host computer 140, may similarly include a CPU, memory, disk or hard drive, monitoring software and other software applications or programs that may be monitored.

An event notification may describe the event and may identify the hardware or software for which the event was detected (such as IP address, MAC address, host ID, printer ID, name of software application, or other identifying information). Examples of an event description may include, for example, "CPU usage exceeds 92% on host 14," or "network access unavailable on Ethernet port 2 of host 12," "disk usage exceeds 85% on hard drive 1422," or "paper jam on printer 9." An event notification may also indicate a severity of the event, or event severity and/or business priority.

For example, a range of exemplary event severities may include: 1) OK, meaning the identified hardware or software is operating normally, such disk usage or CPU usage below a first threshold, 2) Warning severity, meaning not a significant problem, e.g., disk usage or CPU usage has exceeded a first threshold, such as 60%, but is not a significant problem, 3) Minor severity, e.g., a more serious problem than a Warning event, e.g., disk usage or CPU usage has exceeded a second and larger threshold, such as 75%, 4) Major severity, meaning that the severity is greater than a Minor severity, and may be associated with disk usage or CPU usage exceeding a third and larger threshold, such as 85%, for example, and 5) Critical severity, meaning that, for example, the disk usage or CPU usage has exceeded a fourth and larger threshold, e.g., 90%, and/or that immediate action needs to be taken to resolve or remediate the problem/event, otherwise a data loss or loss of system functionality will likely occur, for example. These are just some example severities and associated thresholds, and others may be used.

According to an example implementation, business priority may be a priority level, e.g., from 1 to 5, where a higher number may indicate a higher business priority, e.g., 1 is a lowest priority and 5 is the highest priority in this example. The opposite notation may be used as well, e.g., where a 1 is the highest priority. Business priority may be assigned to each event and/or to each hardware block or software application to be monitored, e.g., based on the business impact of the event or other potential problem that may arise with the monitored hardware or software. For example, a printer out of paper may be low priority, since it may have relatively minimal impact on a company or other business entity. Whereas, "CPU usage exceeds 98%" for an important computer, or a database event that indicates "database corrupted" for an important database for a business entity may be considered much higher business priorities since their failure may have much more negative impact on the business entity, as compared to a printer being out of paper, for example. The business priority may be pre-assigned for each event or event category when monitoring software 130 is configured for a host computer, or business priority may be assigned to each event by event management system 110 when an event is received by event management system 110 from monitoring software 130, for example.

According to an example implementation, event management system 110 may receive event notifications for one or more events. These event notifications may be received from host computers 124, 140, or other computers or computing devices. The event notifications may include event notifications for hardware events and/or software events, for example, and may include an event description (e.g., including a description of the event and/or identification of the hardware or software on which the event occurred), an event severity, a date and/or time that the event occurred, and/or other information related to the event. In an alternative implementation, the event notification may indicate a business priority for the event, or event management system may assign a business priority to the event, e.g., based on the event description. Also, in an alternative implementation, the event notification may also include an event category code that identifies the event category for the event, such as a printer event, network access event, CPU event, disk/memory event, database event, or other event category.

In one example, the event management console 113 may have limited space or area on which to display rows or entries for events. Therefore, in one example implementation, the events may be selected for display that are considered to be the highest priority, e.g., having a highest severity and/or business priority. Therefore, upon receipt of an event notification (or receipt of information for a detected event), a set (or updated set) of events may be selected by event management system 110 that have a highest severity and/or highest business priority. Thus, event management system 110 may compare the severity (and/or business priority) of the received event to the severity and/or business priority of other received events, and, for example, the N events having a highest severity (and/or highest business priority) may be selected for display on the event management console 113, according to an example implementation.

In addition, an event category may be determined for each of the events selected for display. For example, event management system 110 may identify an event category for each event based on an event category code provided in an event notification for an event. Or, event management system 110 may determine an event category for an event based on the received description for the event, e.g., in the case where an event category code is not provided in the event notification for an event. For example, if the term "CPU" is found in the event description, then the event may be categorized as a CPU event. If the event description includes any of the words/phrases "memory", "disk" or "hard drive" or similar terms, then the event may be categorized as a disk/memory event. If the term "printer" appears in the event description, then the event may be categorized as a printer event. Similarly, if any of the terms "network", "port", "network interface" and/or "NIC" (network interface card) appears in the event description for an event, then the event may be categorized as a network access event. These are merely a few examples of event categories and a few examples of techniques that may be used to categorize events, and other event categories and other techniques may be used.

Event management system 110 may then display the event management console 113, including an entry (e.g., row) for each of the events selected for display. For each of the entries or rows within the event management console 113, one or more columns or fields may be provided that identifies the severity and/or business priority of the event, a date/time the event occurred (or was detected), and a description of the event.

According to an example implementation, each time a new event notification is received, an updated set of N events may be selected for display on the event management console, e.g., based on the severity and/or business priority of the received events. The updated set of events is then displayed on the event management console 113, e.g., with one entry or row being provided for each event of the selected set of events. Thus, a new event with a high severity that is selected for display would be added to the event management console 113. While a previously received event that was previously displayed may be dropped from display on the event management console 113 if it does not have a severity and/or business priority that is among the highest N events.

In addition, according to an example implementation, event management system 110 may display one or more dynamic evocations for each event category of the set of events selected for display. According to one example implementation, an evocation may include information that causes, or is designed to cause, an action by the reader or user. In response to the dynamic evocation, the user or administrator may perform some recommended or suggested action that may be designed to at least partially address (e.g., at least partially solve or remediate) the event or problem. In an example implementation, the dynamic evocation may be considered to be dynamic since it may be generated and displayed on the event management console 113 in response to one or more events of a category of events that are detected and/or displayed on the event management console.

In one example implementation, a dynamic evocation may serve one or more purposes. First, a dynamic evocation may provide a suggested course of action in attempt to address or remediate an event or category of events. For example, a dynamic evocation may provide a suggested solution, or may provide or display one or more actions that have in the past solved or remediated the same or similar events/problems. Secondly, a dynamic evocation may, at least in some cases, operate to improve (or assist in improving) a user's or administrator's knowledge about the event management system 110 and/or other various software programs or services that may be part of the event management system 110 or part of one or more related software programs or software services that may be useful in addressing or solving the event or category of events. Third, dynamic evocations may allow for improved product usage, e.g., allow for improved usage of the event management system 110 and any related software programs or services, e.g., by including a dynamic evocation that suggests using another software program or service to diagnose or solve/address the event or problem. For example, without such dynamic evocation, the user or administrator may not have been aware that such additional features of system 110, or additional software programs or services were available.

As noted, according to one example implementation, each dynamic evocation may be event-category-specific. That is, for example, an evocation is not necessarily provided or displayed for each event, but may be provided or displayed on event management console 113 for each category of events for which at least one event is displayed on event management console 113. For example, if there are 20 entries displayed on the event management console 113, and 5 of the entries or rows are for CPU events, then each CPU event related evocation may be displayed once for the CPU event category. For example, in response to a disk/memory event (or disk/memory category of events) that are displayed, a first dynamic evocation may be displayed that states, "Run Disk Cleanup work flow to improve diskspace utilization." A second dynamic evocation for disk/memory events may be displayed that states: "disk/memory usages exceed 90%, please contact your administrator immediately." Multiple dynamic evocations may be displayed for each category of events. However, in one example implementation, each dynamic evocation is displayed only once, even though there may be many or a plurality of events of each (or one or more) category. For example, even if there is more than one disk/memory event that have been received and displayed, the first and second dynamic evocations for disk/memory events are displayed only once on the event management console 113. As a result, duplicate copies of the same evocation are not provided/displayed based on multiple events of same category. Therefore, each dynamic evocation may be applicable to (or provide a suggested course of action or suggested solution for) more than one, and in fact possibly all, of the displayed events of that event category.

A number of additional software programs or software services may be included within event management system 110, or may be provided as additional software programs or software services that may be accessible via event management system 110, for example. These additional software programs or services may include, for example, Probable Cause Analysis (PCA) 116, IT Services Management (ITSM) 118, workflows 120 and monitoring software 122. Monitoring software 122 may locally reside on or with event management system 110, and may communicate with one or more remote hosts 124, 140, to determine when one or more events have occurred on such hosts. On the other hand, monitoring software 130 may be provided as a remote software program installed and running on a remote host computer 124, for example.

PCA 116 may analyze an event to determine a likely or probable root cause for the event, such as by comparing the event to other events, to determine if another event may be a cause, or at least related to, the current reported event.

ITSM 118 provides a service to manage changes or maintenance of various systems, data or programs, such as a database 132. A change request may be submitted by an engineer to ITSM 118 to request that a database 132 be taken down or offline to perform maintenance on the database 132. Approval may be granted and submitted to the ITSM 118 by a manager or supervisor, thereby allowing the planned maintenance to be performed at the specified day/time, etc. According to an example implementation, monitoring software 130 may detect that database 132 is down or offline, and may send an associated database event to event management system 110. For example, the severity of this database event may be reported as critical, since the database is offline. Event management system 110 may send a request for planned maintenance for database 132 to ITSM 118, and ITSM 118 may report the planned maintenance of database 132. Alternatively, ITSM 118 may have previously reported the planned maintenance of database 132 to event management system 110 when the permission was granted to perform such maintenance to database 132. In response to the indication of a planned maintenance to database 132 (including the identified day/time of such planned maintenance), event management system 110 may confirm that the reported database event occurs during the planned maintenance period, and if true, then may change the severity of the database event from critical to OK, which may cause this database event to be dropped or removed from the event management console. This is merely one example, and other examples may be used.

Workflows 120 may include one or more configurable workflows that may be used in attempt to address or resolve an event or problem. A workflow may be a series of operations or steps that are performed to identify the problem and/or solve or address the problem. For example, one or more different workflows may be provided for each event category. The following is an example workflow that may be executed or performed whenever a disk/memory event is received indicating that a disk is full: 1) confirm that the disk is full, e.g., greater than 90% full; 2) remove or delete temporary folders; 3) remove or delete temporary Internet folders; 4) clear recycle bin; and, 5) move some files to another disk.

Dynamic evocations may include language that provides any proposed or suggested action that may address or resolve an event or problem. A dynamic evocation may suggest a specific action be taken, such as: "Release CPU usages by closing applications/programs that are no longer required." In another example, a dynamic evocation may suggest that a workflow be executed: "You may run disk cleanup workflow to improve disk space utilization." In another example, a dynamic evocation may suggest that another software program or service be executed or applied to address the event or problem: "Run Probable Cause Analysis (PCA) to find root cause of any critical event." Note that this dynamic evocation is applicable to any critical event, for example. Another dynamic evocation may include: "If disk usage is above 90%, contact administrator." This last evocation may apply to any disk/memory event where disk usage is above 90%.

Figure 2:
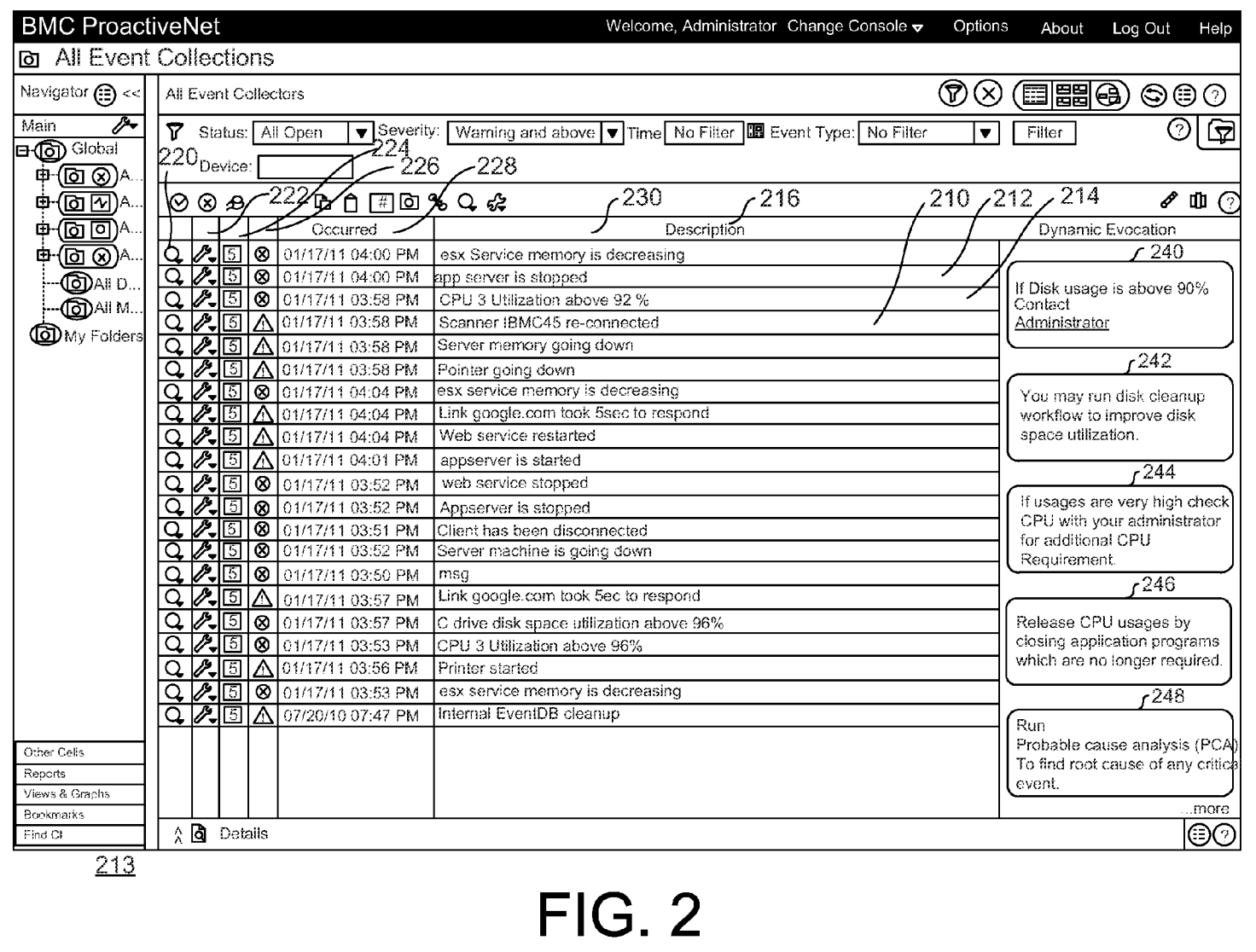

FIG. 2 is a diagram illustrating an exemplary event management console 213. Event management console 213 is one example of event management console 113. An entry or row is provided for each of a plurality of events, including entries (or rows) 210, 212, 214 and 216, for example. A number of fields (e.g., one field per column) may be displayed for each entry or row. In the example shown in FIG. 2, each entry or row may provide information for an event, such as: an event status 220, which may be changed to "acknowledged" (e.g., a check mark icon) when an administrator wants to indicate that this event has been acknowledged as having been read/reviewed, or to "closed" (an X icon) to indicate when an even has been closed, either manually by a user or administrator, or automatically by system 110, e.g., when an updated event for this displayed event indicates that the severity has changed (e.g., from Major to OK), rendering the currently displayed event as outdated or superseded by a more recent event or update to the event. Therefore, when an event has been superseded by a more recent event, the current event may be automatically closed by system 110, for example.

Other fields for each row may also include a tools icon 222 to access other software tools, a business priority indicator 224 indicating a business priority for the event, an event severity indicator 226 indicating a severity of the event, a date/time 228 that the event occurred, and a description 230 of the event which may identify or describe the event and identify the hardware and/or software to which the event occurred (e.g., host 4, or CPU3).

Severity indicator 226 may include a color to identify event severity (a severity-specific color), and an icon (a severity-specific icon) to identify severity of the event. Also, background color of the date/time field 228 may also use the same color to indicate event severity. For example, red may indicate Critical severity, orange may indicate Warning severity, brown may indicate Major severity, yellow may indicate Minor severity, and green may indicate OK severity. As noted, different icons may be used for severity indicator to indicate a severity of each event. An X in the middle of an orange circle (entries 210, 212) may indicate Warning severity, a larger x inside a red circle (entry 214), and an exclamation point inside a yellow triangle may indicate Warning severity for an event, for example. Therefore, different severity icons may indicate different event severities.

An event description 230 is provided for each event. For example, the event description for entry 210 is "esx service memory is decreasing." The event description for entry 212 is "appserver is stopped." And, the event description 230 for entry 214 is "CPU 3 utilization above 92%." These are merely some examples, and many other types of event descriptions may be used.

In addition, event management console 213 may include one or more dynamic evocations, where one or more evocations may be provided for each of the event categories for which an event is displayed on event management console 213. Dynamic evocation 240 states: "If disk usage is above 90% contact administrator." Evocation 242 states "You may run disk cleanup workflow to improve disk space utilization." Evocation 244 states: "If CPU usages are very high check with your administrator for additional CPU requirement." Evocation 246 states: "Release CPU usages by closing applications/programs which are no longer required." Evocation 248 states: "Run Probable Cause Analysis (PCA) to find root cause of any critical event." These are merely some example evocations and other evocations may be used.

Figure 3:
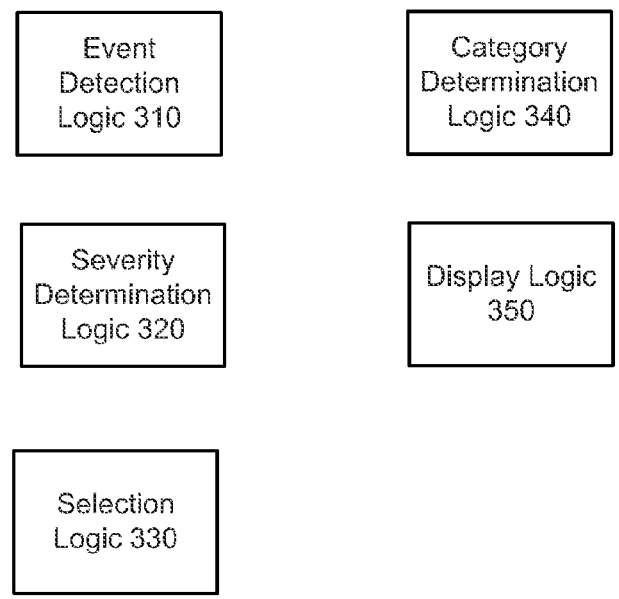
FIG. 3 is a block diagram of an exemplary system for displaying computer events and dynamic evocations.

FIG. 3 is a block diagram of an exemplary system for displaying computer events and dynamic evocations. Event detection logic 310 is configured to detect a plurality of computer events. Severity determination logic 320 is configured to determine an event severity for each event. Selection logic 330 is configured to select a set of the events having a highest severity of the plurality of events. Category determination logic 340 is configured to determine an event category for each event in the set of events. Display logic 350 is configured to display an event management console including an entry for each event of the set of events, each entry in the event management console including at least an event description and an event severity indicator that indicates event severity, wherein the displayed event management console also includes one or more evocations for each event category of the set of events, each evocation providing a suggested course of action to address events of the event category.

Figure 4:
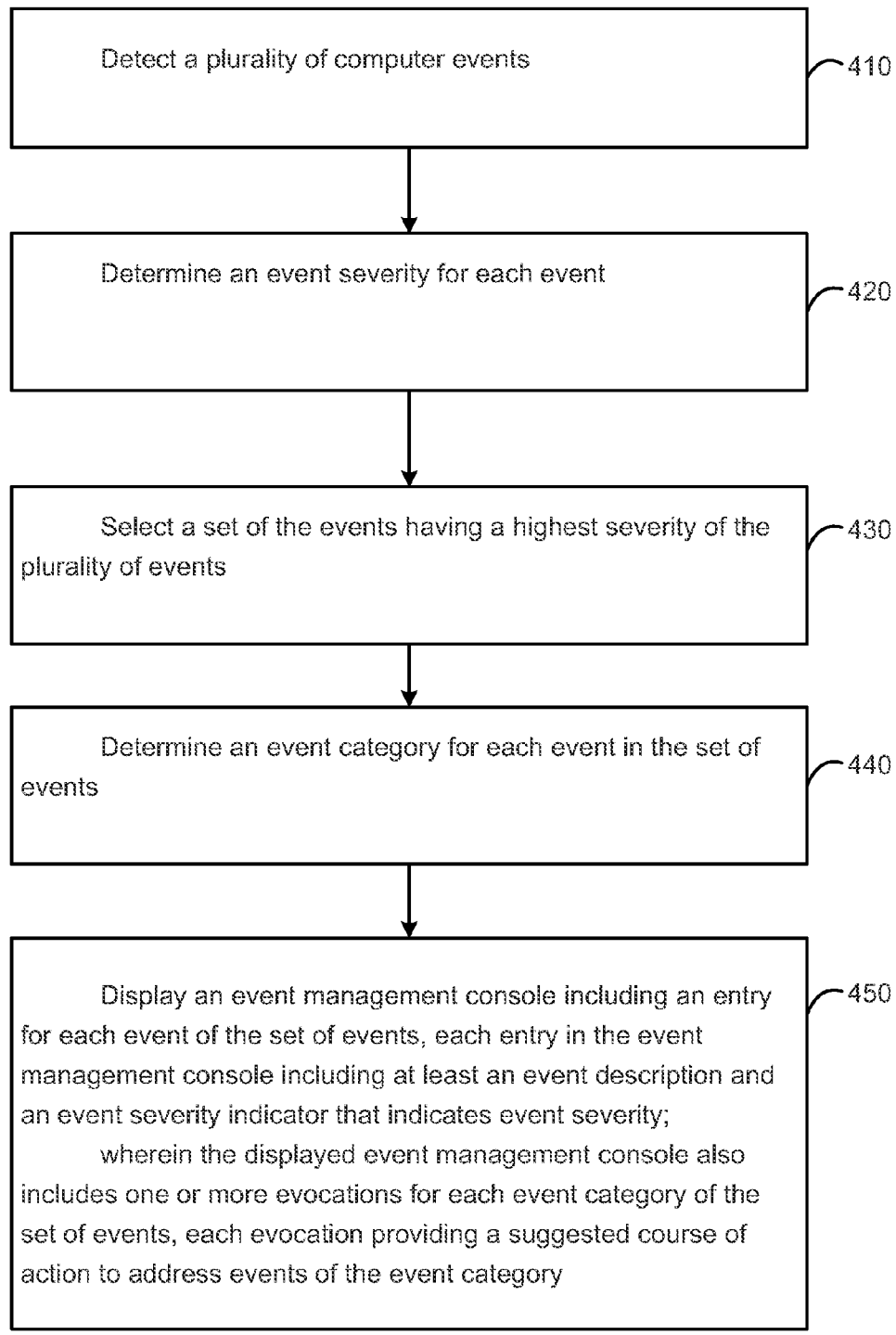
FIG. 4 is a flow chart illustrating operation of an exemplary system to display events and dynamic evocations.

FIG. 4 is a flow chart illustrating operation of an exemplary system to display events and dynamic evocations. At 410, a plurality of computer events are detected. At 420, an event severity for each event is determined. At 430, a set of the events are selected having a highest severity of the plurality of events. At 440, determine an event category for each event in the set of events is determined. At 450, an event management console is displayed including an entry for each event of the set of events, each entry in the event management console including at least an event description and an event severity indicator that indicates event severity, wherein the displayed event management console also includes one or more evocations for each event category of the set of events, each evocation providing a suggested course of action to address events of the event category.

In an example implementation, event management system 110 may correlate each detected event against the set of displayed (or previously received) events by comparing one or more parameters of each detected event to corresponding parameters of the set of events selected for display to determine if the detected event is a duplicate event of one of the events or an updated event of one of the events in the set selected for display. For example, an event notification may indicate that "CPU 3 utilization is above 92%." Thus, the identified CPU (CPU 3) is compared to other events, to see if there are any other events previously reported for CPU 3. For example, this event may be an update of a previously received event that reported CPU utilization for CPU 3 is above 70%. Thus, that previous event reporting 70% utilization would be closed, and replaced with this new event, which may update the description, severity and other information for the CPU utilization for CPU 3. Similarly, if severity level drops for an updated event, e.g., CPU utilization for CPU 3 was 93%, but a newly received event indicates CPU 3 utilization is below 50%, then the first event reporting and displaying 93% utilization may be closed, and might be replaced with the updated information from the new event.

Event correlation may similarly be used to determine if an event is a duplicate of an already received and displayed, e.g., if the newly received event has fields that match the corresponding fields in a previously received event, e.g., identification of the hardware or software where event occurred, time of the event, description of the event, etc. A duplicate event may be discarded, and not displayed, for example.

According to another example implementation, the flow chart of FIG. 4 may further include: determining an event severity for the detected event, selecting a set of the events having a highest severity of the plurality of events, based on a comparison of the event severity of the events including the detected event, determining an event category for the detected event, correlating the detected event against one or more events in the set of events to determine if the detected event is a duplicate event or an update of a previous event, discarding the detected event if the detected event is a duplicate, and updating the entry of the detected event in the event management console if the detected event is an update of an event in the set of events.

According to another example implementation, the flow chart of FIG. 4 may further include: detecting an event, correlating the detected event to events in the set of events based on a comparison of one or more parameters of each event, determining that the detected event is an update to a previously detected event, and updating an entry of the previously detected event in the event management console.

According to another example implementation, the flow chart of FIG. 4 may further include: detecting an event that is an update of a previously detected event that is in the set of events that is displayed in the event management console, discontinuing displaying in the event management console an entry for the previously detected event if the updated detected event indicates a severity that indicates that the updated event is no longer in the set of events having a highest severity of the plurality of events, and removing or deleting, from the event management console, an evocation for an event category for which there are no entries displayed on the event management console.

According to another example implementation, a user may select an entry (or row) on event management console 213 (e.g., click or select a row using a mouse or other pointing device) to cause a new screen to be displayed for an invent that include information related to the event and one or more (e.g., all) of the dynamic evocations applicable to the selected entry or event. This may allow a user to view additional details regarding the selected entry or event, including all of the dynamic evocations that are applicable to the selected row or entry.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A non-transitory computer-readable storage medium comprising computer-readable instructions stored thereon that, when executed, are configured to cause a processor to at least:
   detect a plurality of computer events;
   determine an event severity and a business priority for each event;
   select a set of the events based on the severity and the business priority of the events;
   determine an event category for each event in the set of events; and
   display an event management console including an entry for each event of the set of events, each entry in the event management console including at least an event description and an event severity indicator that indicates event severity; and
   wherein the displayed event management console also includes one or more evocations for each event category of the set of events, each evocation providing a suggested course of action to address events of the event category.

2. The computer-readable storage medium of claim 1 wherein the entry displayed for each event of the set of events also includes a time of occurrence of each event, an event status and a business priority indicator that indicates business priority.

3. The computer-readable storage medium of claim 1 wherein the severity indicators use a different icon or symbol to indicate a different event severity, and wherein the entry for one or more events use a different color to indicate a different event severity.

4. The computer-readable storage medium of claim 1 wherein instructions are further configured to cause the processor to correlate each detected event against the set of events by comparing one or more parameters of each detected event to corresponding parameters of the set of events to determine if the detected event is a duplicate event of one of the events in the set of events or an updated event of one of the events in the set of events.

5. The computer-readable storage medium of claim 1 wherein instructions configured to cause the processor to select a set of the events comprises instructions configured to cause the processor to select a set of N events having a highest severity of the plurality of events.

6. The computer-readable storage medium of claim 1 wherein the instructions further cause the processor to perform the following for each detected event:
   determine an event severity for the detected event;
   select a set of the events having a highest severity of the plurality of events, based on a comparison of the event severity of the events including the detected event;
   determine an event category for the detected event;
   correlate the detected event against one or more events in the set of events to determine if the detected event is a duplicate event or an update of a previous event;
   discard the detected event if the detected event is a duplicate;
   update the entry of the detected event in the event management console if the detected event is an update of an event in the set of events.

7. The computer-readable storage medium of claim 1 wherein the instructions further cause the processor to perform the following:
   detect an event;
   correlate the detected event to events in the set of events based on a comparison of one or more parameters of each event;
   determine that the detected event is an update of a previously detected event; and
   update an entry of the previously detected event in the event management console based on the detected event.

8. The computer-readable storage medium of claim 1 wherein the selecting comprises selecting a set of events having a highest severity, wherein the instructions further cause the processor to perform the following:
   detect an event that is an update of a previously detected event that is in the set of events that is displayed in the event management console;
   discontinue displaying in the event management console an entry for the previously detected event if the updated detected event indicates a severity that indicates that the updated event is no longer in the set of events having a highest severity of the plurality of events; and
   remove or delete, from the event management console, an evocation for an event category for which there are no entries displayed on the event management console.

9. The computer-readable storage medium of claim 1 wherein the instructions further cause the processor to perform the following:
   remove or delete, from the event management console, an evocation for an event category for which there are no entries displayed on the event management console.

10. The computer-readable storage medium of claim 1 wherein each entry of the event management console includes at least an event description, an event severity indicator that indicates event severity and a business priority indicator that indicates business priority for the event.

11. The computer-readable storage medium of claim 1 wherein the instructions further cause the processor to perform the following:
    display a screen for an event that includes at least information describing the event and one or more evocations applicable to the event in response to a selection of the entry for the event displayed on the event management console.

12. The computer-readable storage medium of claim 1 wherein instructions configured to cause the processor to select a set of the events comprises instructions configured to cause the processor to select a set of the events having a highest severity of the plurality of events.

13. The computer-readable storage medium of claim 1 and further comprising instructions configured to cause the processor to assign a business priority to each hardware item or software application for which computer events are to be detected.

14. The computer-readable storage medium of claim 1 wherein one or more of the evocations suggest using another software program or service to address one or more events of an event category.

15. A computer implemented method performed by a processor, the computer implemented method comprising:
    detecting a plurality of computer events;
    determining an event severity and a business priority for each event;

selecting a set of the events based on the severity and the business priority of the events;
determining an event category for each event in the set of events; and
displaying an event management console including an entry for each event of the set of events, each entry in the event management console including at least an event description and an event severity indicator that indicates event severity; and
wherein the displayed event management console also includes one or more evocations for each event category of the set of events, each evocation providing a suggested course of action to address events of the event category.

16. The computer-implemented method of claim 15 and further comprising:
correlating the detected event to events in the set of events based on a comparison of one or more parameters of each event;
determining that the detected event is an update of a previously detected event; and
updating an entry of the previously detected event in the event management console based on the detected event.

17. The computer-implemented method of claim 15 wherein the selecting comprises selecting a set of events having a highest severity, and further comprising:
detecting an event that is an update of a previously detected event that is in the set of events that are displayed in the event management console;
discontinue displaying in the event management console an entry for the previously detected event if the updated detected event indicates a severity that indicates that the updated event is no longer in the set of events having a highest severity of the plurality of events; and
removing or deleting, from the event management console, an evocation for an event category for which there are no entries displayed on the event management console.

18. The computer-implemented method of claim 15 and wherein the selecting comprises selecting a set of the events having a highest severity of the plurality of events.

19. The computer-implemented method of claim 15 and further comprising:
removing or deleting, from the event management console, an evocation for an event category for which there are no entries displayed on the event management console.

20. The computer-implemented method of claim 15:
wherein each entry of the event management console includes at least an event description, an event severity indicator that indicates event severity and a business priority indicator that indicates business priority for the event.

21. The computer-implemented method of claim 15 wherein the detecting a plurality of events comprises receiving, from event monitoring software running on a host computer, information describing an event detected on the host computer by the event monitoring software.

22. The computer-implemented method of claim 15 and further comprising:
displaying a screen for an event that includes at least information describing the event and one or more evocations applicable to the event in response to a selection of the entry for the event displayed on the event management console.

23. A computer system including instructions recorded on a computer-readable storage medium and readable by at least one processor, the system comprising:
event detection logic configured to detect a plurality of computer events;
determination logic configured to determine an event severity and a business priority for each event;
selection logic configured to select a set of the events based on the severity and business priority of the events;
category determination logic configured to determine an event category for each event in the set of events; and
display logic configured to display an event management console including an entry for each event of the set of events, each entry in the event management console including at least an event description and an event severity indicator that indicates event severity; and
wherein the displayed event management console also includes one or more evocations for each event category of the set of events, each evocation providing a suggested course of action to address events of the event category.

24. The computer system of claim 23 wherein each entry of the event management console includes at least an event description, an event severity indicator that indicates event severity and a business priority indicator that indicates business priority for the event.

* * * * *